United States Patent [19]

Renoulin et al.

[11] 4,413,338

[45] Nov. 1, 1983

[54] COMMUNICATION SYSTEM FOR INTERCONNECTING A PLURALITY OF ASYNCHRONOUS DATA PROCESSING TERMINALS

[76] Inventors: Roger Renoulin, 29, rue Jean Mailleux Thorigne, Vilaine F-35510 Cesson; Jean-Yves Le Brun, 34, Boulevard Clemenceau, F-35100 Rennes, both of France

[21] Appl. No.: 244,170

[22] Filed: Mar. 16, 1981

[30] Foreign Application Priority Data

Mar. 20, 1980 [FR] France ............................... 80 06774

[51] Int. Cl.³ .......................... H04J 3/16; H04J 6/00
[52] U.S. Cl. ........................................ 370/89; 370/84
[58] Field of Search .................... 370/89, 90, 86, 79, 370/80, 105, 92, 100, 95, 84, 56; 340/825.05

[56] References Cited

U.S. PATENT DOCUMENTS 3,749,845 7/1973 Fraser .................................. 370/89
3,790,717 2/1974 Abramson et al. ................. 370/89
3,796,835 3/1974 Closs et al. ......................... 370/89

FOREIGN PATENT DOCUMENTS 2205260 8/1972 Fed. Rep. of Germany .
2277487 1/1976 France .
2331221 6/1977 France .

OTHER PUBLICATIONS

Layec et al., "Microprocessors and Packet Switching Networks", *Microcomputer Architectures*, Oct. 1977, pp. 94–101.

*Primary Examiner*—Douglas W. Olms
*Attorney, Agent, or Firm*—Laff, Whitesel, Conte & Saret

[57] ABSTRACT

A communications system interconnects a number of asynchronous data processing terminals, operating at different speeds among themselves, with a high speed switching or communication network. The system uses as a time multiplexed loop linking terminals which are later duplicated for security reasons. The number of terminals that may be hooked up may exceed that which would be provided if all terminals were to be active simultaneously. For this purpose, a signalling or watch function is used in the system to monitor the state of each terminal. This function, which assumes the active (busy) or rest (idle) state of the terminals, is based on a low speed search for terminals at rest, on detecting the change in their states and on the time sharing allocation, of the time multiplexed transmission resource among the active terminals according to their needs. The time sharing of the transmission resource is adaptive.

4 Claims, 5 Drawing Figures

COMMUNICATION SYSTEM FOR INTERCONNECTING A PLURALITY OF ASYNCHRONOUS DATA PROCESSING TERMINALS

The present invention relates to a communications system to interconnect a number of asynchronous data processing terminals operating at different speeds, among themselves, or to a high speed switching or communication network.

More specifically, the invention relates to such a system using as a time multiplexed loop a link with the terminals later duplicated for security reasons. The number of terminals that may be hooked up may exceed a number which would be allowed if all were active simultaneously. For this purpose, a signalling or watch function is used in the system to watch the state of each terminal. This function assumes the active or rest state of the terminals, and is based on a low speed search for terminals at rest. The system operations depend on detecting the change in the terminal states and on the allocation, in time sharing, of the time multiplexed transmission resource among the active terminals, according to their needs. The time sharing of the transmission resource is adaptive.

In accordance with one feature of the invention, the system has a central control circuit, associated with a first microprocessor, and secondary control circuits. Each of the secondary control circuits is associated with one terminal or a group of terminals, which are connected by a looped TDM highway or line transmitting a time multiplex of n channels or time intervals (iT0 to iTn) grouped in multiframes of m frames (0 to m). The time slot or interval iTx of frame 0 contains the multiframe synchronization and the time slots or intervals iTx of frames 1 to p are used to carry out the information exchange. The other time slots iT being used for information exchange. Each secondary control circuit has time slot and frame counters which are respectively connected to time slot and frame number decoders. The outputs of the decoders are connected to an AND gate having an output which is connected to the enable input of a first serial-to-parallel converter which receives the multiplex signals. The parallel output of this converter is connected to an input of a secondary microprocessor. The microprocessor output is connected to the parallel input of a parallel-to-serial converter having an enable input which is connected to the output of a second three input AND gate. The first two inputs of this second AND gate are respectively connected to the time slot and frame counters and the third input is connected to the output of a first flip flop. The flip flop output is connected to the multiplex. The outputs of the time slot and frame number decoders are enabled during the time slots iTx of frames 1 to p.

In accordance with another feature, the microprocessor has one output which is connected to a bus leading to a slot register, a receiving frame register. There are four registers respectively connected to first inputs of four comparators. A slot comparator output is also connected respectively to second inputs of the first and third comparators. The output of the frame counter is also connected respectively to the second outputs of the second and fourth comparators. The output of the first and second comparators are connected to two inputs of a third three input AND gate, whose third input is connected to a control output of the secondary microprocessor. An output of the third AND gate is connected to the enable input of a third serial-to-parallel converter having an input which receives the multiplex signals the output of the third converter is connected to a terminal associated with the second control circuit. The outputs of the third and fourth comparators as connected to two inputs of a fourth AND gate with three inputs, a third of which inputs is connected to the control output of the secondary microprocessor. The output of the microprocessor is connected to the enable input of a fourth parallel-to-serial converter, the output of which is connected to the multiplex.

The above mentioned features of the invention, as well as others, will become clearer upon reading the following description of embodiments, the description being made in relation with the attached drawings, among which:

Figure 1:
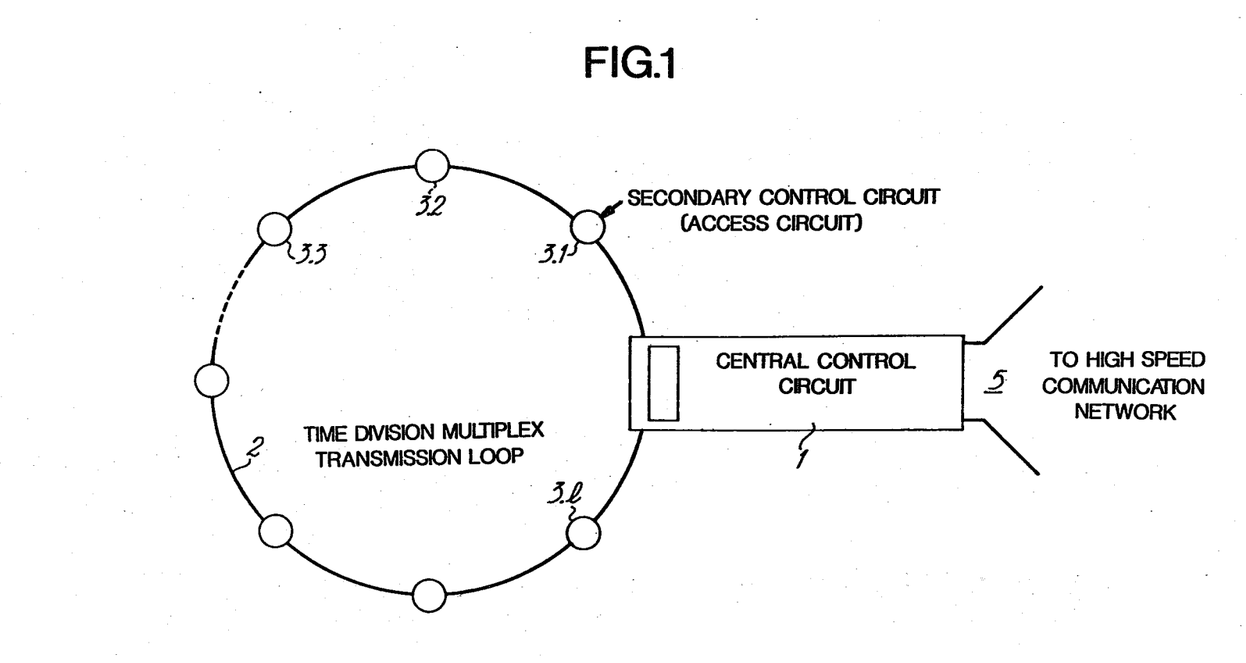
FIG. 1 is a schematic block diagram of a system in accordance with the invention.

FIG. 1 illustrates a system, in accordance with the invention comprised of a central control circuit 1 connected by a loop 2 transmitting a time multiplex to a number of secondary control circuits 3.1 to 3.1 serving as access equipment for the terminals of loop 2.

The central control circuit is, in other respects, connected to a high speed communication network 5, by conventional couplers, not shown, which meet, for example the X25 transmission standards. Thus, in accordance with the invention, the system permits communications between the system secondary control circuits, or between its secondary control circuits and terminals outside of the system through the central control circuit.

Below, instead of considering any given time multiplex, we will consider a primary time multiplex of n-32 channels, with x=16, m=20 and p=9.

As a reference regarding a 32 channel time multiplex, we may refer to the article published on Sept. 20, 1973 by the "CONFERENCE EUROPEENE des ADMINISTRATIONS et TELECOMMUNICATIONS" entitled (in French) "SPECIFICATION DU SYSTEME MULTIPLEX MIC DU PREMIER ORDRE" (in English) "SPECIFICATION OF THE FIRST ORDER PCM MULTIPLEX SYSTEM." If, in the remainder of the description, we cite the use of a multiplex close to that which was defined in this paper, it should be remembered that this application is not restrictive and that, in particular, it would equally be possible to envisage the use of a 24 channel primary multiplex of the "Anglo-Saxon" type. The system in the invention may equally well be used with a multiplex of four times 32 channels, that is 128 channels.

Figure 2:
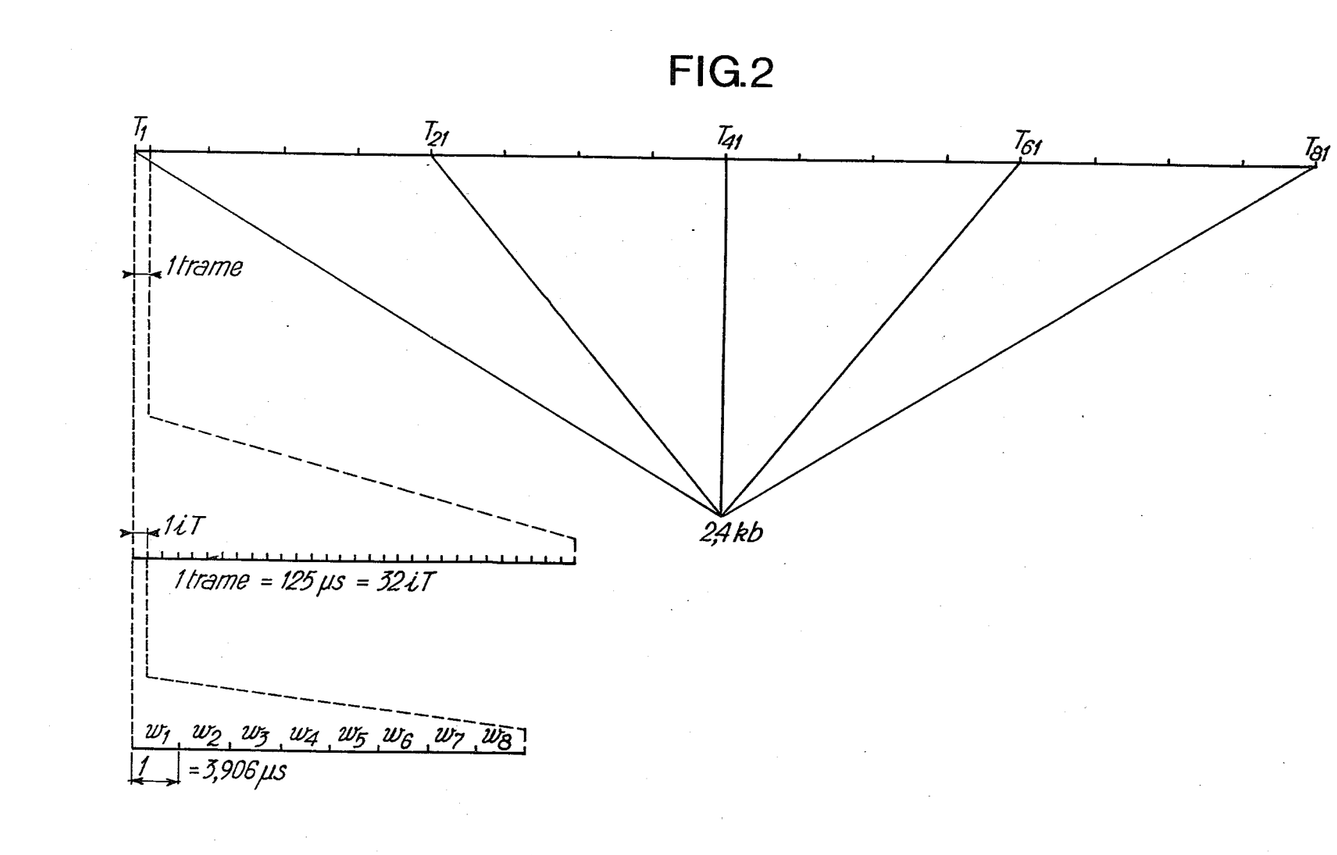
FIG. 2 is a timing diagram illustrating the utilization of a known 32 line primary multiplex.

In FIG. 2, we have shown a timing diagram to recall the make-up of a time multiplex link. In the abcissa, we have shown a sequence of frames T1 to T8, among the continuous sequence of frames forming the link. Each frame lasts 125 microseconds and is made up of 32 time intervals iT0 to iT31. Each time interval is composed of eight elementary times w1 to w8 each serving to transmit one binary element 0 or 1.

In the PCM multiplex mentioned above, in the case of channel by channel signalling, we group the frames into multiframes each having sixteen consecutive frames numbered from 0 to 15 and the multiframe locking signal is 0000, this signal occupying the first four element times w1 to w4 of the first time interval iT1 of frame No0. In other respects, the iT16 of each frame is used to transmit channel by channel signalling. The other iT, that is iT1 to iT15 and iT17 to iT31 are used to transmit speech samples.

This transmission resource, for example for a 64 kbit/s channel, is one frame iT at 2.048 Mbit/s. It is apparent that the mode of operation conventionally provided for telephone links would not be convenient if it was directly transposed in a time mode as it would entail a query every 125 microseconds.

Consequently, in accordance with the invention, we add to the 32 time slot primary multiplex a supplementary multiplexing level inside one of the two time channels (slots) or time intervals iT by grouping the frame into multiframes, following a principle analogous to that which is known for digital transmission. As an example, we make up multiframes containing each twenty frames. In each frame, iT0 contains the frame synchronization information. In each multiframe, the time interval iT16 of frame 0 contains the multiframe synchronization. The intervals iT16 of frames No1 to No19 are assigned to service information exchanges. In each frame, the time intervals iT1 to iT15 and iT17 to iT31 are allocated for data exchanges.

The choice of twenty frames per multiframe allows the multiplexing of channels of 2400 bauds, or obviously channels of 1200 baud, while maintaining a total bit rate of 64 kbit/s, thus 48 kbit/s useful to maintain compatibility with the arrangement defined in note X50 of CCITT.

The loop operation of the system, or eventually multipoint, with synchronous time sharing of the transmission channels assumes a prior signalling exchange phase, according to a signal mode, between the control unit and the access equipment which signal or have signalled their intention to communicate. We have in this, the analogy with offhook by a telephone subscriber.

These messages signalling establishment and break in communications, supervision etc., will conform to normal procedures presently in force, such as those constituting the CCITT recommendations. However, as an illustration, we shall give below an example of a message call and an example of a connection message.

The signalling messages are transmitted in the channel corresponding to iT16 in each frame. They may have variable size, that is they can be made up of a different number of 8 bit bytes, according to the requirement of the message, this number having however an upper limit for practical reasons, as we shall see below.

In fact, by choosing multiframes having twenty frames, we have a multiframe synchronization which allows framing the message rate with respect to frame No. 0 for the query messages transmitted from the control unit towards the access equipments and with respect to frame No. 10 for the response messages transmitted from the access equipment toward the control unit. This time sharing of the multiframes into two subsets of two times ten frames adapts itself at best to the signalling message length which never exceeds ten 8-bit bytes and allows a rate, in each direction, equal to a useful 24 kbit/s which is largely sufficient for all signalling between the control unit and the access equipment.

Before describing the possible make up of the signalling messages or message signal, we shall describe the structure of a synchronization and management logic circuit useable in access equipment hooked to a system in a time distributed loop.

Figure 3:
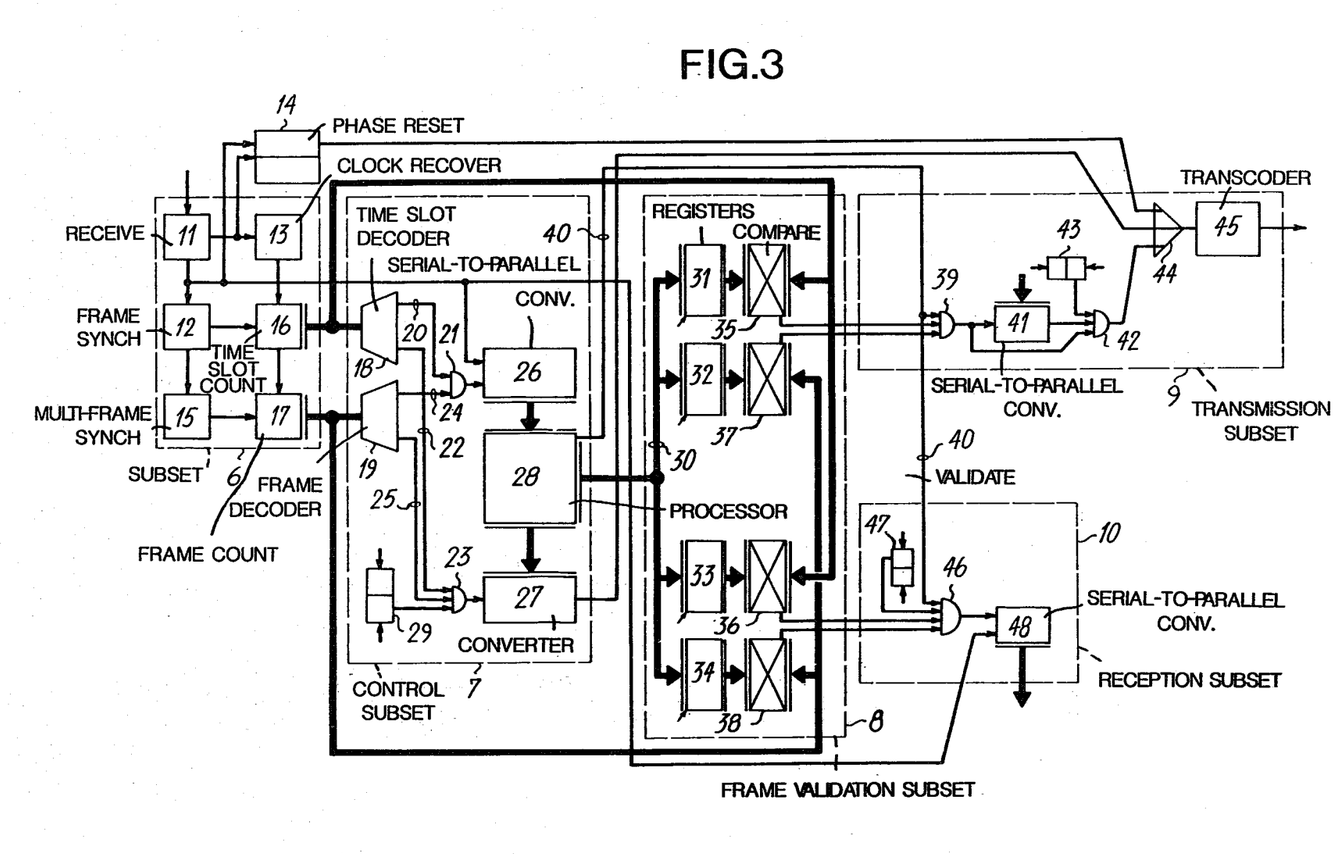
FIG. 3 is a block diagram of time accessing equipment in a system in accordance with the invention.

FIG. 3 illustrates the block diagram of such a synchronization and management logic circuit. It is comprised of a subset 6 of receive frames transmitted on link 2, a control subset 7, a time channel and frame validating subset 8, a transmission subset 9 and a reception subset 10.

The subset 6 consists of a binary receive module 11 HDB3 whose input is connected to link 2 and whose output is connected, in parallel, to the inputs of a frame synchronization circuit 12, a bit rate and clock recovery circuit 13 and a frame phase resetting circuit 14. The output of circuit 12 is connected, on one hand, to the input of a multiframe synchronization circuit 15, and on the other hand, to the initializing input of a time slot counter 16, whose signal input is connected to the output of circuit 13. The output of circuit 15 is connected to the initialization input of a frame counter 17 whose signal input is connected to the output of circuit 13. The output of circuit 15 is connected to the initialization input of a frame counter 16 whose signal input is connected to the overflow output of counter 16.

In the subset 7, the count output of counter 16 is connected to the input of a time slot decoder 18 while the count output of counter 17 is connected to the input of a frame decoder 19. The decoder 18 consists of one output 20 which is connected to the first input of an AND gate 21 and one output 22 which is connected to the first input a three input AND gate 23. The decoder 19 has one output 24 which is connected to the second input of AND gate 21 and one output 25 which is connected to the third input of AND gate 23. The output of AND gate 21 is connected to the enable input of a serial to parallel converter 26. The output of AND gate 23 is connected to the enable input of a parallel to serial converter 27. The serial signal input of converter 26 is connected to the output of module 11. The parallel signal output of converter 26 is connected to the input of a processor 28. A signal output of processor 28 is connected to the parallel input of converter 27. Finally, the second input of AND gate 23 is connected to the output of a flip flop 29 whose control input is connected to an output (not shown) of processor 28.

In subset 8, a control bus 30 energized by processor 28 is connected to the write inputs of four registers 31 to 34. Register 31 serves to register the number of a time slot in one frame, register 32 the number of a frame in a superframe, both being assigned to the transmission register 33 the number of time slots in one frame and register 34 the number of one frame in a multiframe, both being assigned to reception.

The serial outputs of registers 31 and 33 are respectively connected to the first inputs of two comparators 35 and 36 whose second inputs are connected to the signal output of the time slot counter 16. The serial outputs of registers 32 and 34 are respectively connected to the first inputs of two comparators 37 and 38 whose inputs are connected to the signal output of the frame counter 17.

In the transmission subset 9, a three input AND gate has a first input connected to the output of comparator 35, a second input connected to a general validation output 40 of processor 28 and a third input connected to the output of comparator 37. The output of AND gate 39 is connected, on one hand, to the enable input of a serial to parallel converter 41 and, on the other hand, to a first input of a three input AND gate 42 whose second input is connected to the output of a flip flop 43 and third input to the output of converter 41. A three input OR gate 44 has a first input connected to the output of converter 27, a second input to the output of AND gate 42 and a third input connected to the output of a phase resetting circuit. The flip flop 43 has its control input connected to a control output (not shown) of processor 28. The output of OR gate 44 is connected to the input of a regenerative transcoder HDB3 45 whose output is connected to link 2.

In the receive subset 10, a four input AND gate 46 has its first input connected to the output of comparator 36, a second input connected to the general validation output of processor 28, a third input connected to the output of comparator 38 and a fourth input connected to the output of flip flop 47, which has its control input connected to a second control output (not shown) of processor 28. The output of AND gate 46 is connected to the enable input of a serial to parallel converter 48 whose signal input is connected to the output of receiver module 11 and whose output is connected to a data terminal.

Before we describe the different operations which may result from the different meanings of the message byte, we shall describe, with respect to FIG. 3 the reception, and then the transmission of bytes.

The receiver module 11 yields at its output the successive bits corresponding to the signal applied to its input. In the frame synchronization circuit, the content of iT0 is recognized and, at each identification, a synchronization signal is transmitted to the time slot counter 16 which it initializes. The byte clock recovered by circuit 13 advances counter 16. When counter 16 identifies iT16, its output signal causes the output signal of circuit 11 to pass to the multiframe synchronization circuit 15. When circuit 15 recognizes the multiframe synchronization signal in the corresponding iT16, it transmits an initialization signal to counter 17. Counter 17 counts the frames by counting the overlfow signals of circuit 16. We note that in practice the set of circuits 11, 12, 13, 15, 16 and 17 exist in the marketplace in the form of an integrated circuit, such as the PCM circuit marketed by the "Societe Lignes Telegraphiques et Telephoniques (LTT)."

In conclusion, the data combinations from comparators 16 and 17 identify completely one iT in its frame and its multiframe.

At each iT16, the decoder 18 activates its output 20. At each of the frames No. 0 to 9, the decoder 19 activates its output 24. Therefore gate 21 opens for each iT16 of frames No. 0 to 9. At each opening of gate 21, the corresponding bits of iT16 are introduces serially in converter 26 which transmits the corresponding byte to microprocessor 28. The microprocessor 28 has comparison means which allow it to recognize the messages addressed to it from the signal channel and means to register the contents of an interrogation message.

After the microprocessor 28 has recognized its identity and the contents of the question message, it activates flip flop 29, such that when the outputs 22 of 18 and 25 of 19 are activated at iT16 of frame No. 19 and following ones, the bytes transmitted in parallel by 28 to converter 27 are transmitted serially to the transmission circuit 45, by way of OR gate 44.

We will now describe the structures of the interrogation and answer messages.

As the signal channel iT16 is shared among all the access equipment, it is necessary to provide a message header giving the identity of the addressee, in the case of a query, or the identity of the sender, in the case of a response, also the format, that is the length of the useful message, as this length which is always less than ten bytes is variable.

We have, for a query message, the following structure:

byte No. 1 (iT16, frame No. 0) No of access equipment of the addressee byte No. 2 (iT16, frame No. 1) 4 redundancy bits for the equipment No. plus 4 bits for the length of the message byte No. 3 to 10 contents of the message.

We have for an answer message, the following structure:

byte No. 1 (iT16, frame No. 10) sender access equipment no.

byte No. 2 (iT16, frame No. 11) 4 bits of redundancy for the equipment no., plus 4 bits for the length of the message bytes No. 3 to 10 contents of the message.

To avoid accessing conflicts by the access equipments to the answer channel, represented by iT16 of frames 11 to 20 of a superframe, it is provided that the access equipments may only transmit a message in response to a query by the control unit. This procedure requires a systematic search of the 256 equipments, which corresponds to the eight bits of byte No. 1 of a query message, which can be hooked to the loop, though the equipments may be hooked individually or in clusters.

Under these conditions, a complete query-answer cycle lasts 256 times twenty frames, that is $256 \times 20 \times 125 \times 10^{-6}$ seconds, that is 640 milliseconds. This duration is quite reasonable for a watch scan guaranteeing the search of equipments changing from an idle to an active state. In the present description, we consider as active equipment access equipment having a call up or hook up message to send. In the case of a call up, the message is generally made up of the number of the subscriber requested.

If we assume that the terminal associated to the access equipment is a telephone subscriber station, the number of the subscriber requested is comprised of the digits AB PQ MCDU in binary coded decimals, which leads to four bits per digit, that is four bytes for a complete number. The type of message, for example call up message or hook up message, must also be coded. The type of service to which the access equipment wants access, for example a telephone network, a Transpac network, a facsimile network, a Teletel network, etc., must also be coded. If we reserve four bits to differentiate a type of message among sixteen possibilities and four bits to differentiate one service among sixteen, it is evident that the call up message has seven bytes, that is byte No. 1—access equipment identity (frame 0)
byte No. 2—4 redundancy bits plus 4 format bits
byte No. 3—4 message type bits, plus 4 service type bits
byte No. 4—requested subscriber's number
byte No. 5—requested subscriber's number
byte No. 6—requested subscriber's number
byte No. 7—requested subscriber's number If we assume rates of 1200 or 2400 bauds for the telematic system applications in accordance with the invention, and if we assume that the data rates are of a symmetrical nature, we choose to reserve the first ten frames of the multiframe for transmission in one direction (from control unit to access equipment) and the last ten frames of the multiframe for the other direction (access equipment to control unit). Of course, we must understand that the 2 Mbit/s transmission system is looped and that the two directions defined above are only a contrivance of the language.

Due to the splitting into two subsets of ten frames, we have only 32 kbit/s per direction of transmission for one time slot assigned to data, which makes, when considering the p.p.c.m. a useful 24 kbit/s, that is twenty active terminals at a rate of 1200 bits/s or ten active terminals at a rate 2400 bit/s on one time slot.

In one embodiment, we have kept this useful rate of 24 kbit/s per time slot because of the required recurrence for addressing in time the different active channels. Thus, a terminal at 1200 bauds will be able to transmit in its alloted all twenty frames, which means that we must specify to it the frame number, from the twenty, which it is alloted.

In the first example with an access equipment associated with a terminal at 1200 bauds, we assume that the control unit transmits by the message defined above the command to the access equipment to use frame No. M in the multiframe and iT No. Y to transmit to the control unit data bytes coming from the terminal associated with the access equipment. The processor 28 thus transmits to register 31 the value of number Y and to register M, by means of bus 30. In later operation, each time that the output of counter 16 indicates the count Y and the output of counter 17 the count M, the comparators 35 and 37 respectively detect a coincidence and activate their respective outputs. In other respects, the processor 28 activates at the appropriate time its output 40, for example, the time of a superframe having transmitted by means of 27 the reply message which serves as acknowledgement of the received command. Finally, the processor causes flip flop 43 to change state.

Gate 39 is thus opened, so is gate 42, and at each iTY of a frame No. M, the data byte introduced in parallel in register 41 is transmitted in series by circuit 45, by way of OR gate 44.

During this transmission, the control unit can, from time to time, send to processor 28 a query message, as defined above, to determine the status of the terminal, that is to know if it still has or has not data to transmit. The processor indicates the status by a reply message in response to the query by control unit 1. At the end of transmission, the processor erases the contents of 31 and 32, and when the control unit 1 has received, by reply message the information to release, it can release iTY and frame No. M for another access equipment.

In a second example of a transaction with an equipment associated with a 1200 baud terminal, we assume that the control unit 1 transmits by the service message of the query type the command to the access equipment to use frame No. N in the multiframe and iTz to receive in the associated terminal data bytes coming from the control unit. The processor 28 thus transmits, by bus 30, to register 33 the value of number z and to register 34 the value of number N. In the later operation, each time the output of counter 16 indicates a count of z and the output of counter 17 a count of N, the comparators 36 and 38 respectively detect a coincidence and activate their respective outputs. In other respects, the processor 28 activates its output 40 at an appropriate moment, for example as in the previous example, and causes a flip flop 47 to change state.

Gate 46 is thus open and at each iTz of a frame No. N, the message available at the output of circuit 11 is introduced in converter 48 from which it is transmitted in parallel to the associated terminal. When the control unit 1 has completed its transmission, it serves notice to processor 28 by an appropriate service message. Processor 28 thus brings to rest flip flop 47.

In a third example of a transaction with an access equipment associated with a terminal operating at 24 bauds, it can be seen that the access equipment can transmit two bytes per superframe, say for example one byte every ten frames. In this case the command message transmitted by the control unit contains the number of the iT to be used and the two frame numbers to use in a superframe. As a variant, instead of containing the numbers of the two frames, the command message may contain the number of the first frames to use, followed by information giving the periodicity of repetition of transmission in the multiframe. In we elect to use periodicity information, the command message will have the following form:

byte No. 1—Access equipment identity (frame 0)
byte No. 2—4 bits of redundancy plus 4 bits of format
byte No. 3—4 bits for type of message, and 4 bits for type of service
byte No. 4—5 bits for the iT No. to be used (iT 0 to 15 for transmission, it16 to 31 for reception)
byte No. 5—4 bits for one frame No. among 20
byte No. 6—5 bits for frame repetition periodicity.

It should be noted that byte No. 6 of the above message may be used whatever is the rate of the terminal associated with the access equipment. In fact, the 5 bits of byte No. 6 allow the identification of a periodicity of twenty frames for 1200 baud terminals, of ten frames for 2400 baud terminals and five frames for 4800 baud terminals, etc.

Figure 4:
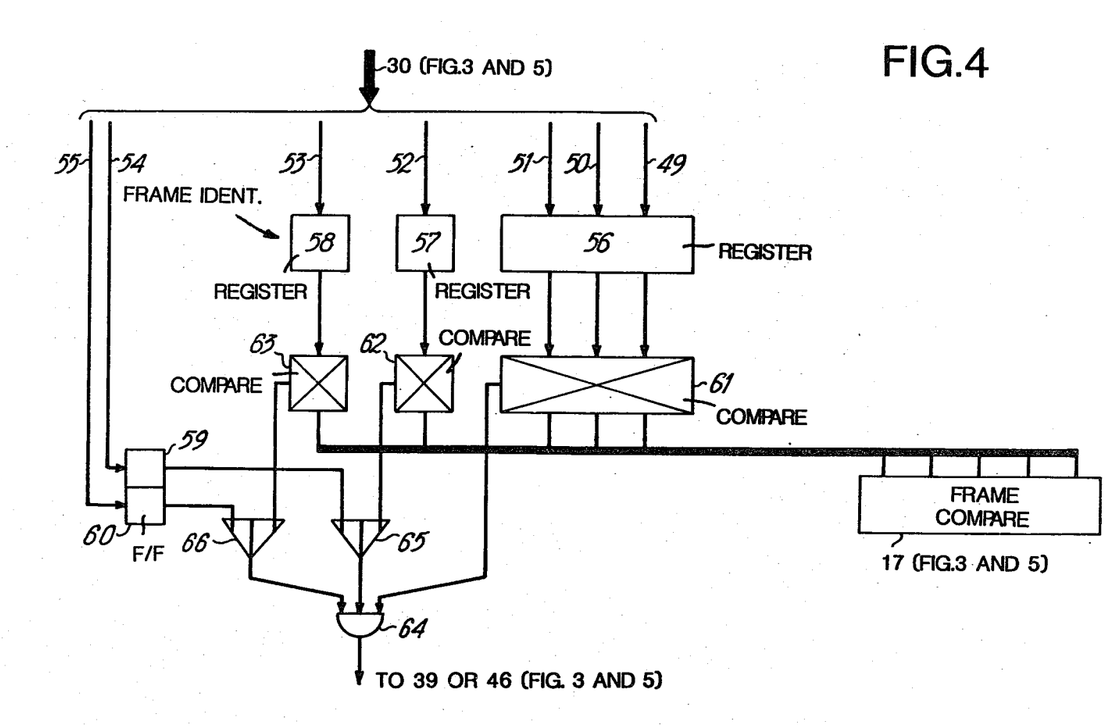
FIG. 4 is the schematic of a comparison circuit which can be used in the circuit of FIG. 3.

FIG. 4 illustrates a circuit intended to replace circuits 32 and 37 of FIG. 3 to allow the synchronization and management logic circuit to process one six byte command message mentioned above.

In the circuit of FIG. 4, we have seven wires 49 to 55 connected to bus 30. The wires 49 to 51 are connected to the inputs of a register 56 which can record three bits which identify one frame among five. The wire 52 is connected to register 57 which can record one bit which can identify whether the number of a frame is between 1 and 5, or between 6 and 10. The wire 53 is connected to a register 58 which can record one bit which identifies if the No. of a frame is between 1 and 10 or between 11 and 20. Wire 54 is connected to the input of a flip flp 59 and the wire 55 is connected to the input of a flip flop 60.

The three outputs of register 56 are respectively connected to the first three inputs of a comparator 61 whose second three inputs are connected to the corresponding wire of the output of frame comparator 17. The output of register 57 is connected to the first input of a comparator 62 whose second input is connected to the corresponding output of counter 17. Similarly, the output of register 58 is connected to the first input of a comparator 63 whose second input is connected to the corresponding output of counter 17.

The output of comparator 61 is connected to the first input of a three input AND gate 64 whose output is connected to one input of an AND gate 39. The output of comparator 62 is connected to the first input of a two input OR gate 65. The output of comparator 63 is connected to the first input of a two input OR gate 66. The outputs of OR gates 65 and 66 are respectively connected to the second and third inputs of AND gate 64. The output of flip flop 59 is connected to the second input of OR gate 64 and the output of flip flop 60 is connected to the second input of OR gate 66.

If we assume that the command message does not contain any byte No. 6, the states of wires 54 and 55 are at 0, which results in 0 outputs on flip flops 59 and 60. In this case, the inputs of AND gate 64 will be level 1 for only one frame in twenty, which is appropriate for the traffic of a 1200 baud terminal.

If, in the command message, byte No. 6 indicates a repetition assignment periodicity of one frame every ten frames, the processor 28 sets wire 55 to 1. The output of flip flop 60 is thus at level 1 which is transmitted, by Or gate 66 to the third input of gate 64. Therefore, as soon as there is a positive comparison in comparators 61 and 62, gate 64 transmits a 1 level, that is that the No of the frame is P or P+10. The circuit thus allows processing 2400 baud terminals.

If, in the command message, byte No. 6 indicates a repetition periodicity of five frames, the processor 28 sets the wires 54 and 55 to 1. the outputs of flip flops 59 and 60 are at level 1, such that the second and third inputs of 64 are at 1. Thus, as soon as there is a positive comparison in comparator 61 the gate 64 transmits a 1 level, that is to say the number of the frame is either P, P+5, P+10 or P+15. The circuit thus allows processing 4800 baud terminals.

Of course, the circuit of FIG. 4, may also replace the circuits 34 and 38 for data reception. The output of 64 is then connected to one input of AND gate 46.

Figure 5:
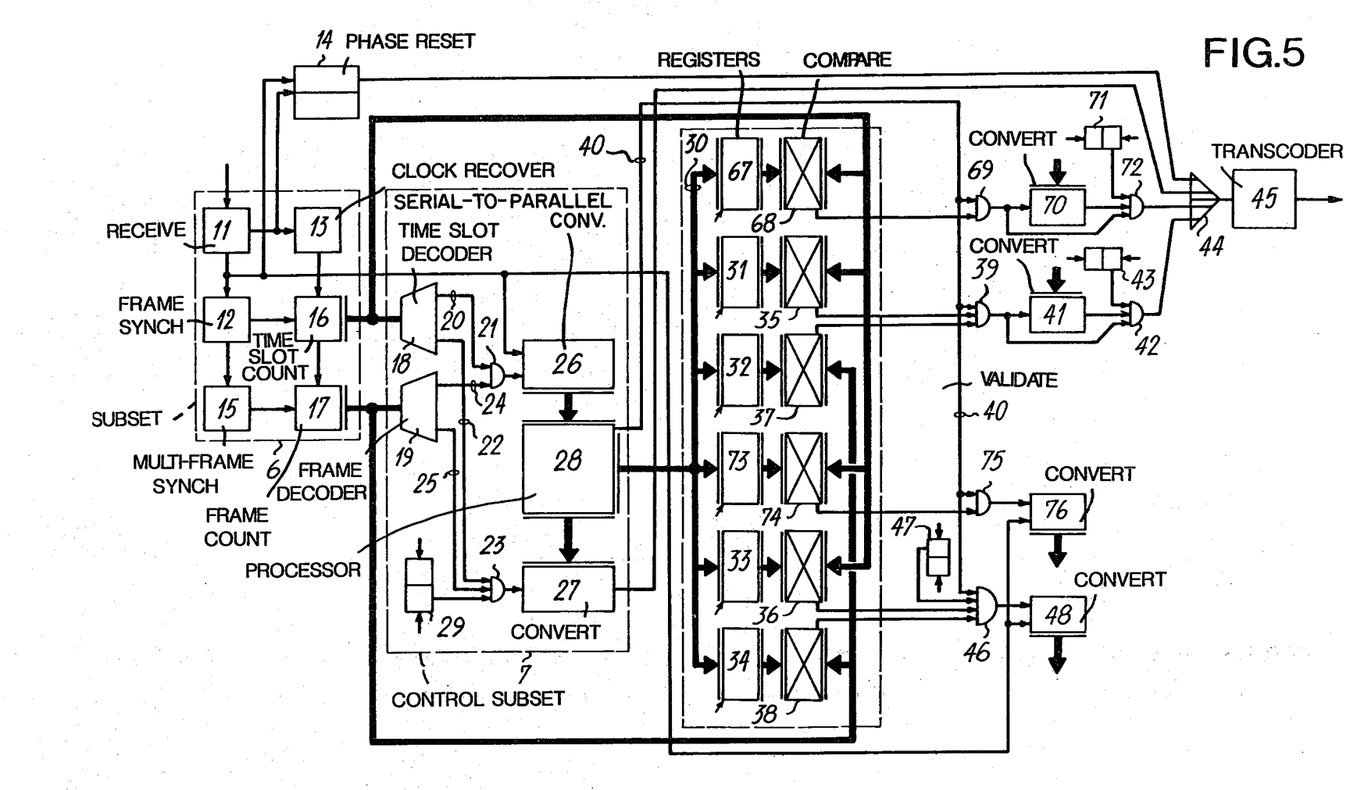
FIG. 5 is a block diagram of one variant of the circuit of FIG. 3.

In FIG. 5, we have shown a synchronization and management logic circuit that can be used in access equipment capable of processing messages from 1200, 2400, or 4800 baud equipments, as we have seen above, but also capable of processing telephone speech signals.

The circuit of FIG. 5 is comprised of all the circuits of FIG. 3 and later those of FIG. 4. It is comprised, also of, a register 67 whose input is connected to bus 30 and whose output is connected to one input of a comparator 68 whose other input is connected to the output of the slot counter 16. The output of 68 is connected to one input of a two input AND gate 69 whose other input is connected to wire 40 and whose output is connected to the enable input of a parallel to serial converter 70. The outputs of 69, 70 and of a flip flop 71 are connected to the three inputs of an AND gate 72 whose output is connected to an extra input of OR gate 44. The parallel input of converter 70 is connected to the coder of a telephone station associated with the access equipment.

The register 67 can record the slot No. in a frame transmitted to it by processor 28. As, for telephone communications, we provide the assignment of one slot per frame, the coincidence in 68 with the count of 16 is sufficient to empty converter 70. The flip flop 71 has the same part as 43 and gate 72 has the same part as 42.

Of course, on the receiver side, we have the corresponding circuits, that is to say a slot No. register 73, a comparator 74, a two input AND gate 75 and a serial to parallel converter 76 whose output is connected to the telephone station decoder.

The circuit of FIG. 5 illustrates that a logic circuit, in accordance with the invention, can guarantee the transmission in both directions of data originated at or sent to, at one and the same time, to a telephone and a data terminal. Clearly, we can multiply the slot No. and frame No. registers, with the corresponding comparators and converters, to allow, aside from the telephone, the simultaneous processing of a number of data terminals. The branching of these circuits would be easy for a person knowledgeable in the state of the art.

In the application examples described below, we have considered synchronous transmission channels. However, in the case of channels allotted to asynchronous transmission, the access equipment, in accordance with the invention can be used. For this case, due to the sporadic nature of the data transmission, for example from a keyboard, the channel must be, aside from the useful characters, filled with stuffing characters FF.

With regards to synchronous transmission channels (2400 bit/s, 4800 bit/s, etc.) the retained structure is identical to the X50 frame structure recommended by the CCITT, which, due to a 6+2 arrangement, allows in a 64 kbit/s time slot to carry a useful 48 kbit/s, that is an integral multiple of current rates (300 bits/s, 600 bits/s, 1200 bit/s, 4800 bits/s, 9600 bits/s) which simplifies the multiframe multiplexing structure, even if in the retained multipoint network topology, the signalling is carried by the signal channel of iT6 and not by the bias of wire "S" of arrangement "A2" for which only the synchronous frame limiting bit is used.

In the case of a call from a packet switched network, for example the TRANSPAC network, this call message will be made up in a manner closely resembling a packet of a call, that is the length of the coded address on four bits and up to ten decimal digits, that is a total of six bytes that will occupy the iT16 of frames No. 4 to No. 9.

We must, for the case of a call to a telematic service, specify the class of rate at which we wish to communicate.

As an example, given the limited number of services to which we can access, the class of rate may be implicitly contained in the four service type bits defined above. Thus we can provide eight classes:
class 0=64 kbit/s telephone
class 1=asynchronous teletel at 1200 bit/s
class 2=asynchronous facsimile at 2400 bit/s
class 3=asynchronous access to Transpac
class 3=asynchronous access to Transpac
class 8=synchronous access We will now consider a connection message example. Once it has been recorded in the control unit, the call message must be translated into a "connection" from the caller to the callee. In the case of a telephone call, the "connection" amounts to assigning a time slot to the caller and, if the requested is a local subscriber (local communication) a time slot to the requested.

This "connection" marker function is exactly analogous to those we find in time switching networks. We must then send to each correspondent (caller and callee) the time slot No. on which it must transmit and the time slot No. in which it must listen to its correspondent.

The connection message will thus be made up for the caller by the following sequence:
byte No. 1 (iT16, frame No. 0) access equipment no.
byte No. 2 (iT16, frame No. 1) 4 bits of redundancy plus 4 bits of format
byte No. 3 (iT16, frame No. 2) 4 bits of connection function plus 4 bits of network type byte No. 4 (iT16, frame No. 3) 5 bits of transmission slot No. plus three bits of redundancy byte No. 5 (iT16, frame No. 4) 5 bits of reception slot No., plus 3 bits of redundancy For the callee, the message will be similar, the time slot No.'s being inverted. We must understand that before transmitting this connection message to the callee, the control unit has addressed to its access equipment a call message to ring the callee and that it has responded by a message indicating its off hook state.

Of course, for the system's operating security, all three messages require a correct reception acknowledgement which is necessary to validate carrying out the operations requested by the messages.

It can be seen that, in each secondary control circuit, the multiplex transmission time is delayed with respect to its emission time, the delay covering the recovery operations of the bytes intended for the terminals associated with the secondary control circuits and the byte insertion operations for those bytes sent by these terminals. To this delay is added that which is due to the clock recovery by circuit 13. The frame phase resetting circuit 14 keeps track of these delays so that at the output of gate 44, the relative positions of the time intervals can be maintained.

This method of time pinpointing (or more generally scheduling) is based on the recognition of the frame and multiframe beginnings synchronization codes, in the frames iT0's, which allows each secondary control circuit to offset its time base with respect to the master time base of the central control circuit. Thus, in the extent where the synchronization code suffers, in the secondary control circuit and in the central control circuit, the same delays as the useful data, we may compare the time reference on the loop to a time-belt mechanism. As there may be any number of secondary control circuits on the loop and thus any total delay, we must provide, in the central control circuit, a time resetting apparatus for the informations before it is inserted at the point of origin on the loop.

Thus, in the central control circuit is provided a FiFo memory where the information is placed with reference to a reception time and released or retransmitted with reference to a transmission time defined by the master time base.

The embodiments of the invention in which an exclusive property or privilege is claimed are defined as follows:

1. A communication system for connecting to each other a number of asynchronous data processing terminals operating at different speeds, or for connecting the terminals to a high speed switching and communication network, said system comprising a central control circuit means and a plurality of secondary control circuit means, each of said secondary control circuit means being associated with a terminal or a group of terminals, a time division multiplex transmission loop means which transmits a time multiplex of signals in time slots grouped into multiframes of frames of information, a particular time slot of a first frame containing multiframe synchronization information and the corresponding particular time slot in other frames being assigned to provide for an information exchange, counter means in each secondary control circuit means for counting time slots and frame, the outputs of said counter means being coupled to time slot and frame number decoder means, said decoder means having outputs coupled to an AND gate, the output of said AND gate being coupled to the enable input terminals on a first serial-to-parallel converter means, means for applying a time division multiplex of signals to a serial input on said first serial-to-parallel converter means, microprocessor means having an input coupled to parallel outputs of said first serial-to-parallel converter means, an output of said microprocessor means being coupled to the parallel input of a second parallel-to-serial converter means, an enable input of said second parallel-to-serial converter means being coupled to the output of a three input AND gate, the first two inputs of said three input AND gate being respectively coupled to the outputs of the said frame and time slot decoders and the third input of said three input AND gate being coupled to the output of a first flip flop, the output of said three input AND gate being coupled to the multiplex loop means, and the outputs of the time slot and frame number decoders being activated for the duration of said other frames.

2. The system in accordance with claim 1, wherein there are a plurality of said microprocessor means, each microprocessor mean shaving one output coupled to a bus linking it with a receive channel register means, a receive frame register means, a transmission channel register means, and a transmission frame register means, said four register means being respectively coupled to first inputs of four individually associated comparator means, channel counter means having outputs respectively coupled to second inputs of the first and third of said comparator means, frame counter means having outputs respectively coupled to the second inputs of the second and fourth of said comparator means, another three input AND gate, the outputs of the first and second comparator means being coupled to two inputs of said other third three input AND gate, the third input of said third gate being coupled to a control output of the microprocessor means, the output of the microprocessor means being coupled to an enable input of a third serial-to-parallel converter means, said third serial-to-parallel converter means having an input coupled to receive the multiplex signals and having an output which is coupled to a terminal associated with one of said secondary control circuit means, the outputs of the third and fourth of said comparator means being coupled to two inputs of a further three input AND gate having a third input coupled to the control output of the microprocessor means, and the output of said further three input AND gate being coupled to an enable input of a fourth parallel-to-serial converter means having an output coupled to the multiplex transmission loop.

3. The system in accordance with claim 2, wherein each secondary control circuit means comprises a plurality groups of four register means, each of said groups of register means comprising a receive channel register means, a receive frame register means, a transmission channel register means, and a transmission frame register means, and groups of comparator means, each of said groups of comparator means comprising a first, a second, a third and a fourth comparator.

4. The system in accordance with claim 2 or 3, wherein at least one of the secondary control circuit means includes a telephone.

* * * * *